UNITED STATES PATENT OFFICE.

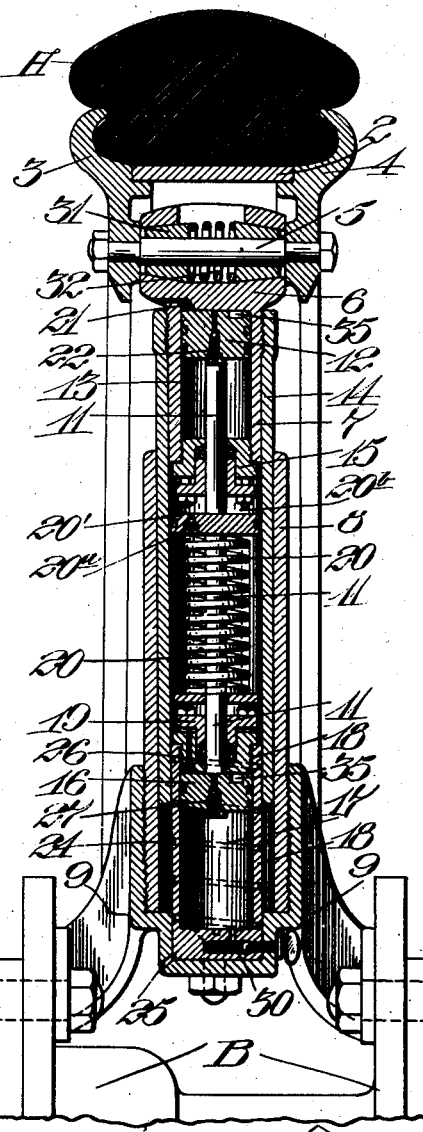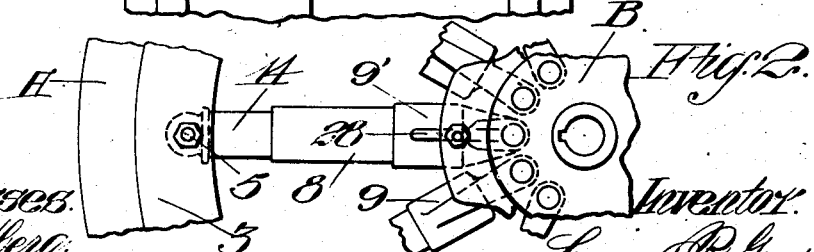

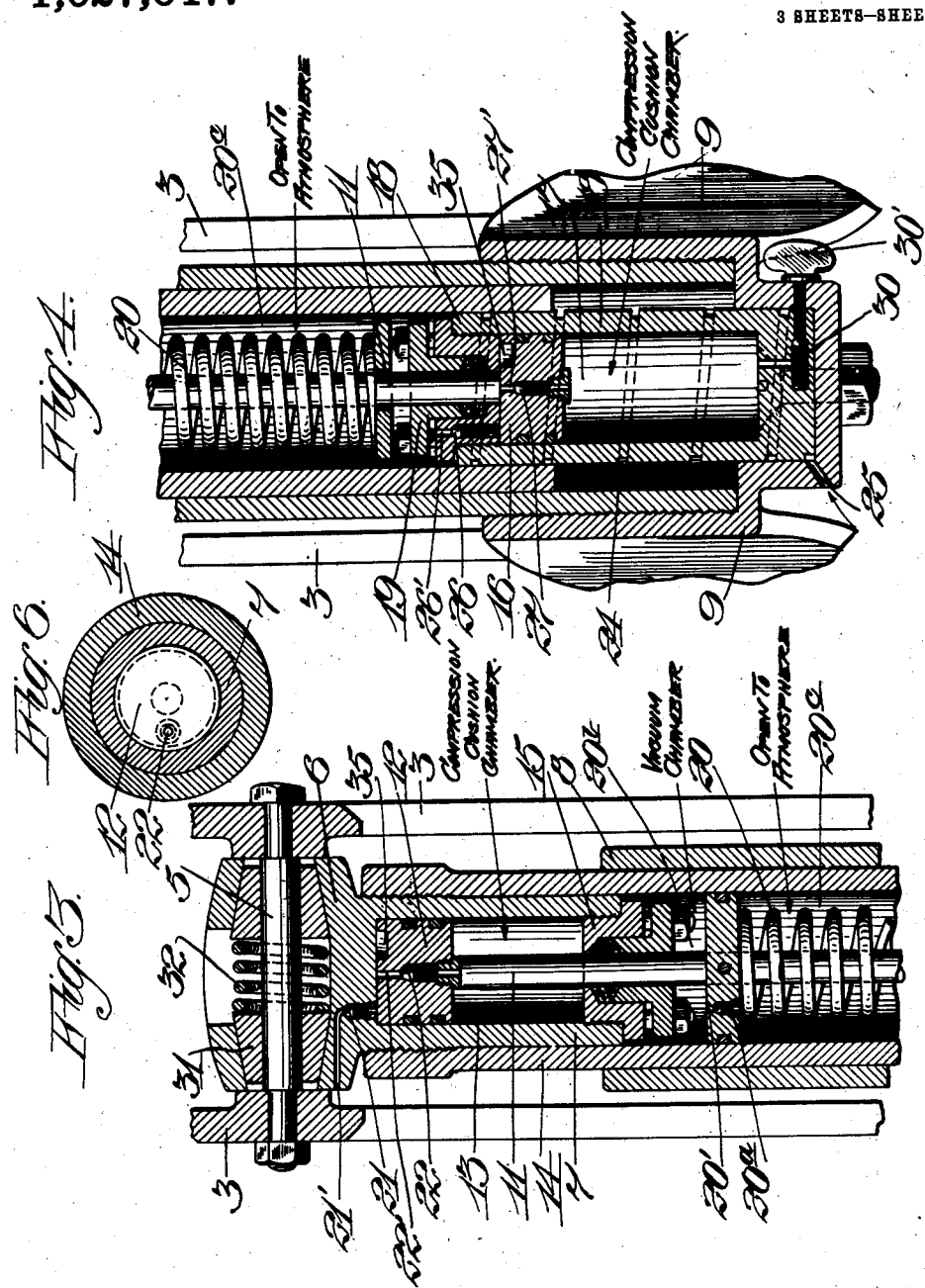

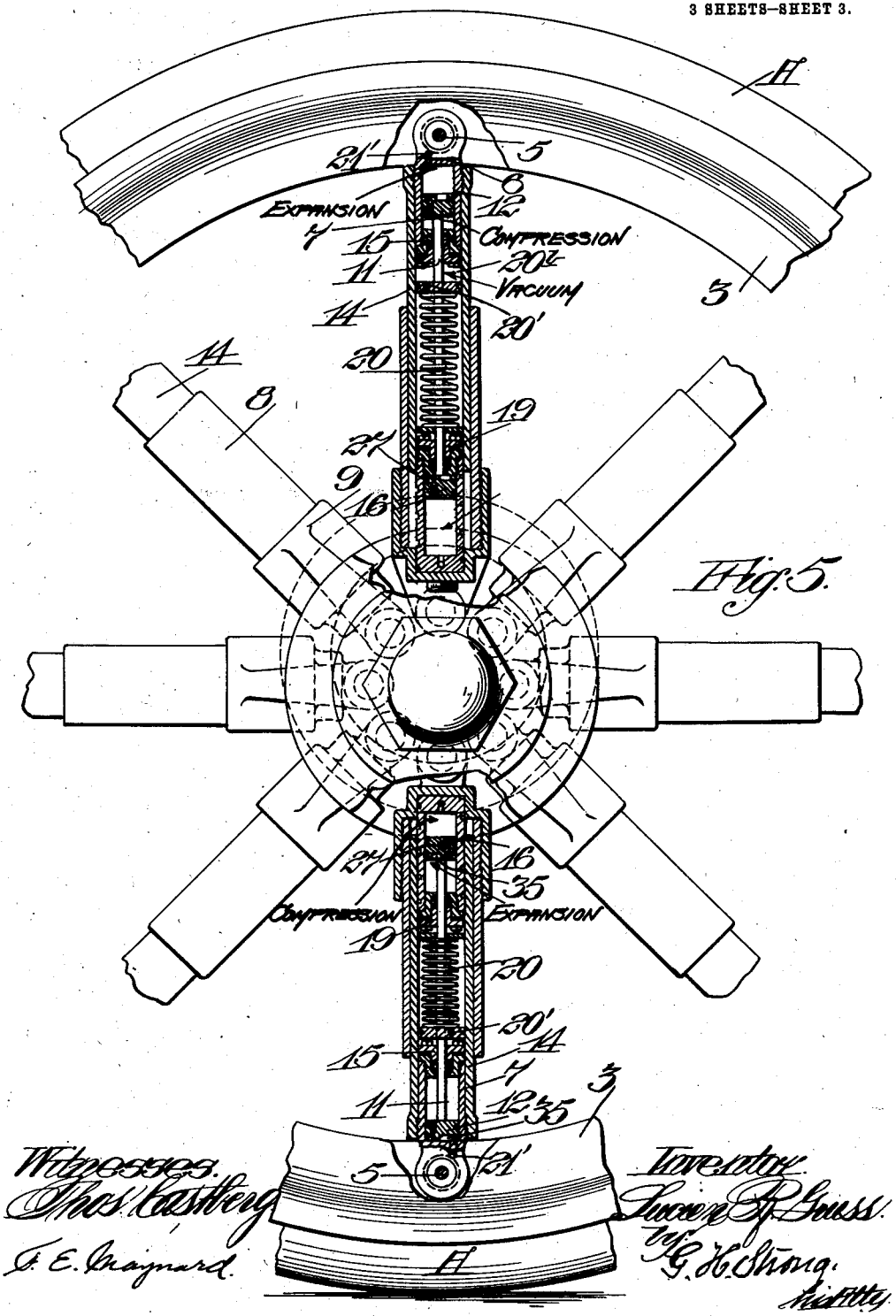

LUCIEN R. GRUSS, OF CHICO, CALIFORNIA, ASSIGNOR TO AUTO-COMPRESSED-AIR WHEEL COMPANY, OF CHICO, CALIFORNIA, A CORPORATION OF CALIFORNIA.

VEHICLE-WHEEL.

1,027,647.

Specification of Letters Patent.

Patented May 28, 1912.

Application filed August 8, 1910. Serial No. 576,231.

*To all whom it may concern:*

Be it known that I, LUCIEN R. GRUSS, citizen of the United States, residing at Chico, in the county of Butte and State of California, have invented new and useful Improvements in Vehicle-Wheels, of which the following is a specification.

This invention relates to vehicle wheels, and particularly to cushion wheels for automobiles, and the like.

The object of my invention is to devise and provide an efficient, simple, reliable wheel which will have the necessary and desired degree of resiliency usual in the ordinary pneumatic tire, but which dispenses with said tire, and is much more durable and economical; and it is a special object to provide a combination of telescopic spoke-sections which present a neat, attractive appearance, and within which operate a differential floating piston whereby the cushioning effect is produced.

The invention consists of the parts and the construction and combination of parts as hereinafter more fully described and claimed, having reference to the accompanying drawings, in which—

Figure 1 is a longitudinal sectional view of a spoke and one side of the rim and tread, and showing a part of the hub in elevation. Fig. 2 is a fragmentary side elevation of a spoke with parts of a hub and the outer rim. Figs. 3 and 4 are enlarged details in section of the opposite ends of the spoke shown in Fig. 1; Fig. 3 being a section of the outer end of the spoke showing the piston and valve arrangement, and Fig. 4 being a similar view of the inner end of the spoke. Fig. 5 is a side elevation in partial section of the top and bottom portions of the wheel showing diagrammatically the positions of the spoke sections and piston during the operation of the wheel. Fig. 6 is an end view of piston 12, showing position of port 22'.

The accompanying illustrations represent a form of my invention as actually constructed and successfully operated, and embodies a suitable cushioning, solid tread of rubber or other material A, detachably mounted upon a rim 2 and clamped by clenchers 3 and 4 which are bolted together and to the rim by the bolts 5. The bolts 5 form pivots for the outer ends of my spoke members which are made up as follows: A socket piece 6 is pivoted upon each bolt 5, and to the cylindrical extension 7 of each socket piece is securely joined a cylindrical male spoke-section 14 telescoping with a complementary cylinder 8. The cylinders 8 are rigidly fastened in suitable trunnions 9, all, except one, of which, as shown at 9', Fig. 2, are pivoted in an appropriate hub B, which may be either of the floating or driven type. The relative lengths of the spoke-sections 14 and the cylinders 8 are such that the hub B and wheel-rim 2 may have a floating, independent, movement to and from each other radially and otherwise, as the wheel revolves.

One feature of this invention upon which it is desired to lay particular stress comprises the means whereby the relative motion of the hub and rim is so controlled and checked that all possibility of transmitting vibrations, generated when the wheel is running, to the supported body of the vehicle are entirely prevented and at the same time the operation of the cushioning means is automatic, reliable and simple, and the hub is maintained normally concentric with the rim and the tendency so prevalent in this class of wheels for the wheel to become eccentric or lop-sided is obviated. In the present instance I accomplish these results by introducing within each hollow composite spoke, a floating, differential plunger or piston having a stem 11 and two piston heads 12—16; the smaller outer piston head 12 working in the socket 6 and in engagement normally with the bottom of the socket-piece 6, when the hub B is in a position centrally of the wheel rim. The end of the chamber in cylinder 7 in which the piston 12 works is closed by a packing gland 15 to form a compression chamber 13, and the piston rod 11 works through gland 15; the piston 12 normally abutting against the closed opposite end or head of the compression chamber 13. Opposite piston head 12, rod 11 is provided with another piston head 16, operating in the compression chamber 17 formed by an inner cylinder 18, which is concentric with and spaced from the main spoke section cylinder 8, and is secured in any suitable manner to the trunnion 9; the outer male spoke sections 14 working between the cylinders 8—18. The outer end of the cylinder 18 is closed by a packing gland 19, to inclose a compression chamber 17 formed between the gland 19 and the piston head 16; the piston rod 11 working through gland 19 just as it does through gland 15. I have shown the pistons 12—16 as being of different size, with the piston 12 slightly smaller than the piston 16, and I have so used them in practice. Also I have shown the chamber 17 a little larger than chamber 13. The double pistons 11—12—16 are disconnected from both the hub and rim, and are free to move in the spoke cylinders, except as prevented or retarded by vacuum and compression, as later described. When the hub B is concentric with the rim, all the outer piston heads 12 are in their outermost position resting against the bottom of the chambers in sockets 6, as shown in Figs. 1 and 3, and the pistons 16 are resting against the glands or cylinder heads 19, see Figs. 1 and 4, in their chambers 17. In order to insure the rapid return of each piston to that position during the revolution of the wheel, a spring 20 may be employed which acts against gland 19 and a collar 20' on the piston rod.

From the foregoing it will be seen that normally both pistons 12—16 are at the end of their stroke in one direction in their respective chambers, and that the spoke-sections 14—8 may be lengthened or shortened under limitations controlled by the compression or vacuum on the two sides of the pistons 12—16, all as will appear more clearly hereinafter.

Collar 20', which is fixed to and movable with piston rod 11 has an air tight working fit in the cylinder 14, see Fig. 3, and is provided with a port 20ᵈ, in which is a small check valve 20ᵃ. The collar 20' thus forms a diaphragm or piston which divides the space between the glands 15—19 into two compartments, one of which 20ᵇ forms a vacuum chamber between the collar or diaphragm 20' and gland 15; the other of which 20ᶜ provides a housing for spring 20 and is open to the atmosphere continually, by means of a spiral groove 24, formed in the periphery of the cylinder 18 and opening to the atmosphere at 25, Fig. 4. The collar or diaphragm 20' acts as a piston, which in conjunction with the vacuum chamber 20ᵇ, supplements the cushioning action of the pistons 12—16, as will be more fully described.

A small chamber or pocket 35 is formed on the outer end of piston 12 adjacent to its seat in socket 6, and a similar pocket 35 is formed on the inner end of piston 16, which seats on the gland 19. These two pockets or chambers 35 of the double ended piston, constitute small compression chambers, and it is by means of them that the automatic operation of the pistons is effected, and the desired resiliency of the wheel maintained, as will appear shortly. Chamber 35 in piston 12, Fig. 3, may communicate with the atmosphere through a port 21' which is normally closed by valve 21; and this same chamber 35 in piston 12, and the space which may be formed between piston 12 and the bottom of the socket 6, may communicate from time to time with the compression chamber 13 through a port 22' in the piston 12, which port is provided with a normally closed valve 22. Similarly, by reference to Fig. 4, the small compression chamber or pocket 35, in piston 16 may communicate with the atmosphere intermittently through a valved port 26', the space 20ᶜ and the spiral groove 24 and port 25. Port 26' is normally closed by the valve 26. Chamber or pocket 35 in piston 16 and the space which may be opened up between piston 16 and gland 19 is in communication intermittently with the compression chamber 17 through a port 27', which latter is normally closed by the valve 27.

Oil may be delivered to the interior of the spoke through a valved port 30 in trunnion 9; this port usually being closed by a plug 30', Fig. 4.

A very reliable means for automatically taking up the wear of the socket pieces 6 on the bolts 5 is afforded by means of a pair of cones 31 passing over bolt 5 and spread and seated by a spring 32.

In operation the movements of a double ended floating piston, as here described, in its spoke, is as follows:—Assuming that the wheel is running and a load is imposed upon the hub, then all of the spokes below the center of the hub B will tend to be telescoped or shortened and those above the hub will tend to be lengthened, as illustrated, on an exaggerated scale by the lop-sided or eccentric appearance of the wheel in Fig. 5. By reference to that figure, and looking at the spoke below the hub it will be manifest that since the head 12 seats against the outer end (which for the time being is the lower end) of the cylinder 13, it can go no farther outward toward the rim; but since the spoke section 8 has been so pushed down over section 14 as to shorten the spoke (and in so doing having at the same time shoved down cylinder 18 over piston 16 so as to move gland 19 away from piston 16) a compression is produced in chamber 17 on the upper side of piston 16, and correspondingly a tendency to vacuum is produced on the underside of piston 16 and between the latter and the gland 19. That is, this particular piston 16 acts as a pump to draw in air through the port 26', and also to compress the air in chamber 17. However, this suction action by piston 16 is effective only when the air already trapped in the space or pocket 35 on the underside of piston 16 is at, or less than atmospheric pressure. If the air in space or pocket 35 of piston 16 is above atmospheric pressure, this trapped air in pocket 35 will expand as the gland 19 moves downward away from piston 16 until the pressure of this trapped air, or of the air between piston 16 and gland 19 is reduced below atmosphere when valve 26 will open and let in more air. Meanwhile, the cushioning of the load is effected by the compression in chamber 17, and also to some extent by the vacuum in chamber 20$^b$. Whatever pressure there is in chamber 13 is simply acting on piston 12 to keep it seated in the bottom of its cylinder. Now assuming that this underneath spoke in Fig. 5 has turned a one-half revolution until it is in the position of the spoke directly over the hub. In coming to this position above the hub, the piston 16 gradually moves back toward its gland 19, and in so doing the air which has been admitted past the valve 26, (if any has been admitted) is compressed between piston 16 and gland 19 until its pressure is equal to the pressure of the air in chamber 17, whereupon valve 27 in piston 16 opens and allows an equalization of pressures on the two sides of piston 16; the piston 16 continuing its movement toward its seat on gland 19 by virtue of the lengthening of the spoke; valve 27 closing when the piston 16 rests against gland 19 again. Of course valve 26 closed the moment that piston 16 started to move toward gland 19, which it did after reaching its limit of compressive movement in the chamber 17. It is to be remembered that valve 26 only opens when there is a reduction of pressure below atmosphere on the side of piston 16 adjacent to gland 19, but after the spoke is pumped up the admission of further air past valve 26 is only intermittent and occurs only as the pressure runs down below a point automatically determined by the load. This automatic regulation is effected by means of the pocket 35, above described. In the return operation of the piston 16 toward gland 19, there has been trapped in pocket 35 a small volume of air at the same pressure as the air in chamber 17, which pressure is very much above atmosphere, consequently the next time the load acts to shorten the spoke, (which occurs on the completion of the revolution of this spoke, and when gland 19 moves away from piston 16,) this air expands, as before described; but until the amount of movement of the gland 19 with respect to piston 16 is great enough, or the leakage from space 35 sufficient to reduce the pressure in space 35 and in the space between the piston 16 and gland 19 below atmosphere, valve 26 does not open, and hence no fresh air is admitted. The pumping of the air is entirely determined by the load carried. If the load is increased so that on the first few revolutions of the wheel the piston stroke is greater than the air pressure still low on the two sides of the piston, then more air may be drawn into the cylinder until the piston stroke shortens, and the air pressure has increased to a point so that the air pressure between piston 16 and gland 19, when the piston and gland are farthest apart, is above atmosphere. Whenever the air pressure between the piston 16 and gland 19 becomes less than atmosphere, just enough air is let in past valve 26 to raise the pressure in the piston, so that when the piston and gland are next separated, there will still be a pressure above atmosphere. As long as the volume of air compressed in the pocket 35 is under sufficient pressure that when expanded into the larger space between piston 16 and gland 19, as those two parts are separated, it will still be above the atmosphere, then so long will the valve 26 remain closed. In actual practice, if the spokes have been allowed to lose their compression, the pumping action of drawing in air past valve 26 continues for several revolutions of the wheel, the movement of the piston becoming shorter at each successive revolution, on account of the increasing resistance in the compression chamber. As soon as the combined resistance in the compression chambers 17—35 of the spokes which are nearest the ground, is equal to the weight imposed upon them, no more air can enter chamber 17, because the pressure of the air in the compression chamber 17 is greater than that contained in the intermediate chamber 35 and likewise no more air can enter the intermediate chamber 35 because the air it now contains, is at a higher pressure than the atmosphere. Once the wheels are pumped up equal to the weight imposed upon them, it is absolutely impossible to force any more air into the compression chambers, without increasing the weight they are carrying; yet the wheel has a springiness or yield corresponding to the expansibility of the air in chambers 35 and without taking in any more air until needed.

From the foregoing description of the operation of piston 16 in its chamber during one complete cycle, it is believed that the operation of the outer piston 12 will be readily understood; the only difference between the operation of the two pistons 12—16 being that the piston 16 acts as a pump when the spoke is below the hub, while the piston 12 acts as a pump to maintain a suitable air pressure in its compression chamber 13 when the spoke is above the hub. Thus looking at Fig. 5, the tendency of the upper spoke is to lengthen just as the tendency of the lower spoke is to shorten. In the upper spoke it is seen that the piston 16 can move no farther outward by reason of the stop afforded by the gland 19, consequently the rim pulls up on the sections 14—7 thereby opening a vacuum space above this upper piston 12 and tending to draw in air through the port 21'; but the admission of air through port 21' is dependable entirely on the air pressure in the pocket 35 in piston 12, and in the space between the piston 12 and the bottom of the socket 6, just as before described in connection with the air pressure and pocket 35 of the piston 16.

Although each spoke has two compression chambers 13—17, they are subject to a pumping action alternately: chamber 17 when the spoke is below the hub, and chamber 13 when the spoke is above the hub. It will also be noticed that the opposing spokes simultaneously produce resilient, resistant cushions, one in the chamber 13 in the upper spokes, and one in chamber 17 in the lowermost spokes. The air cushions and air traps provided, as above described, prevent each piston from being violently seated.

An advantage in using a differential piston is, that the greater area of pressure on piston 16 accelerates the return outwardly of the piston, thus assisting the spring 20, which may if desired, be dispensed with. The collar piston 21 by reason of the vacuum behind it in chamber 20$^b$ supplements the spring 20 to cause a quick return of the piston heads 12—16 toward their respective seats at the ends of the chambers 13—17; the vacuum in chamber 20$^b$ being caused when the collar 21 moves away from gland 15, the valve 20$^a$ self-seating at that time. The purpose of the valve 20$^a$ is to allow for the escape of any air which may leak into or be trapped in chamber 20$^b$, so that the latter will always act as a vacuum chamber.

The feature to be emphasized in this invention, is the floating double ended pump piston, wholly disconnected from the hub and rim, with the piston heads 12—16 resting against and supported by their respective cylinder heads when the rim and hub are concentric; these pistons each controlling and operating in a compression chamber, and acting alternately as a pump; the pressure in the chambers 13—17 being controlled in proportion to the volume of expansible air in the small chambers 35.

Where the wheel is to be used as a driver, or traction member, suitable means may be employed to positively transmit power from the hub to the wheel rim, and therefore I connect one of the trunnions as 9', Fig. 2, rigidly to the hub by a key 28, Fig. 2, and pivot the outer end of the spoke to the rim. In this way, one spoke is secured to the hub so that it cannot oscillate, but its telescoping members are free to slide and cushion radially of the hub without interfering with the cushioning action of the other spokes of the wheel.

The object of fixing the inner end of one spoke rigidly to the hub, and pivoting the outer end to the rim, is first, to provide a means for transmitting power from the shaft and hub to the rim, and second, to provide a fulcrum about which the rim is movable as the compression of the spokes successively occurs during the revolution of the wheel. It will be obvious that if all the spokes were pivoted at their inner and outer ends, there would be much lost motion or twisting of the hub with relation to the rim. The single spoke fixed rigidly to the hub applies power directly while the pivot at the outer end forms a fulcrum about which the wheel may swing to the limited distances caused by the successive compression and expansion of the springs as they approach and recede from a point vertically beneath the axle. This fixed spoke with the pivot in the rim is a most important feature.

Having thus described my invention, what I claim and desire to secure by Letters Patent is—

1. In a cushioned vehicle wheel, the combination of a hub and a rim, spoke members made up of telescoping sections, one section of each spoke being pivoted to the rim, and all the other sections of the other spokes except one, being pivoted to the hub, and a double differential cushioning, floating piston in each of said spokes and disconnected therefrom, and also from the hub and rim, with one head of the piston working in one section and the other head of the piston working in another spoke section.

2. In a vehicle wheel, the combination of a hub and rim, spoke members made up of telescoping sections, one section of each spoke being pivoted to the rim, and all the other sections of the other spokes except one, being pivoted to the hub, and a double cushioning floating piston in each of said spokes and disconnected therefrom, with one head of the piston working in one section and the other head of the piston working in another section, the chambers in which said pistons work being closed on their adjacent ends, and means by which both of the heads for each piston normally are at the outer end of their stroke in their respective cylinders.

3. In a vehicle wheel, the combination of a hub and a rim and connecting spoke members between, each spoke consisting of a tubular section connected to the rim, and another tubular section connected to the hub, said sections telescoping one with the other, a double ended floating cushioning piston housed in each spoke and working in respective cylinders therein, and means by which the outer end of each of said pistons have a head normally abutting against the outer end of its chamber.

4. In a vehicle wheel, the combination of a hub and rim, spoke members made up of telescoping sections, one section of each spoke being pivoted to the rim, and all the other sections of the other spokes except one, being pivoted to the hub, and a double floating piston in each of said spokes and disconnected therefrom, with one head of the piston working in one section and the other head of the piston working in another section, the chambers in which said piston heads work being closed on their adjacent ends, means by which both of the heads for each piston normally are at the outer end of their stroke in their respective cylinders with the heads of each of said double pistons normally supported at the outer ends of their respective chambers, and means by which each piston head works on vacuum on one side and on compression on the other side.

5. In a vehicle wheel, the combination of a hub and rim, spoke members made up of telescoping sections, one section of each spoke being pivoted to the rim, and all the other sections of the other spokes except one, being pivoted to the hub, and a double floating piston in each of said spokes and disconnected therefrom, with one head of the piston working in one section and the other head of the piston working in another section, the chambers in which said piston heads work being closed on their adjacent ends, means by which both of the heads for each piston normally are at the outer end of their stroke in their respective cylinders with the heads of each of said double pistons normally supported at the outer ends of their respective chambers, means by which each piston head works on vacuum on one side and on compression on the other side, and means by which air admitted on the vacuum side is delivered into the chamber on the compression side.

6. The combination in a vehicle wheel of a rim and a hub, trunnions pivoted to the rim and other trunnions on the hub, all of which latter except one, have a pivotal motion on the hub, telescoping spoke members connected with the opposed trunnion members and housing resilient means for supporting the hub.

7. The combination in a vehicle wheel of a rim and a hub, connecting spoke members therebetween, said spoke members each comprising two telescoping sections, all of said spoke members pivotally connected to the rim, and all of said spoke members except one, pivotally connected to the hub, and cushioning means housed by the spoke sections.

8. The combination in a vehicle wheel of a rim and a hub, connecting spoke members therebetween, said spoke members each comprising two telescoping sections, all of said spoke members pivotally connected to the rim, and all of said spoke members except one, pivotally connected to the hub, and cushioning means housed by the spoke sections, said last named means including a floating double piston member.

9. In a vehicle wheel, the combination of a hub and a rim and connecting spoke members therebetween, said spoke members each comprisng a pair of telescoping sections, one section pivoted to the rim, and the other to the hub, cushioning means including a rigid floating double ended piston housed in each spoke member with one end of the piston working in a compression chamber in one section, and the opposite end working in a compression chamber in the complementary spoke section.

10. In a vehicle wheel, the combination of a hub and a rim, spoke members extending between the hub and rim, transverse bolts extending through the outer ends of the spokes and pivotally connecting said spokes to the rim, sleeves turnably mounted on the bolts having internal conical chambers, oppositely disposed cone bearings in the chambers embracing the bolts, and spring members between said bearings.

11. In a vehicle wheel, the combination of a rim and hub, and a spoke connected to the hub and pivoted to the rim, the pivot of said spoke consisting of a sleeve inclosing a bearing chamber with conical bearing blocks fitting the ends of the chamber and spaced from one another, pivot bolts passing through the blocks and rim, and a spring acting against the blocks to take up wear.

12. In a vehicle wheel, the combinaton of a hub and rim and connecting spokes therebetween, the spokes pivoted to the rim, the hub having flanges, trunnions secured to the flanges, the spokes comprising each a trunnion mounted on said flanges and carrying a radially disposed cylinder, a second cylinder telescoping therewith, and pivotally connected with the rim, and a double ended piston having one head working in one of said cylinders, and the other working in the other of said cylinders, with means by which said piston automatically acts to maintain a compression on each of its heads when the wheel is running.

13. In a vehicle wheel, the combination of a rim and a hub and spoke member therefor, each spoke member comprising a socket member pivoted to the rim, a cylinder member secured to the socket member, a trunnion secured to the hub and carrying a cylinder telescoping with and outside of said first named cylinder, said trunnion carrying a second cylinder telescoping with and inside of the first named cylinder on the socket, a double ended piston having one end working in said second cylinder, and the other end working in a chamber in the socket, said second cylinder and said chamber closed at their adjacent ends, and through which ends the stem of said double ended piston works.

14. In a vehicle wheel, the combination of a rim and a hub and spoke members therefor, each spoke member comprising a socket member pivoted to the rim, a cylinder member secured to the socket member, a trunnion secured to the hub and carrying a cylinder telescoping with and outside of said first named cylinder, said trunnion carrying a second cylinder telescoping with and inside of the first named cylinder on the socket, a double ended piston having one end working in said second cylinder, and the other end working in a chamber in the socket, said second cylinder and said chamber closed at their adjacent ends, through which end the stem of said double ended piston works, and means by which said pistons are maintained normally at the outer end of their stroke, in their respective cylinders.

15. In a vehicle wheel, the combination of a hub and a rim, spoke members made up of telescoping sections, one section of the spoke being pivoted to the rim, and all the other sections of the other spokes except one, being pivoted to the hub, a double ended piston in each of said spokes and disconnected therefrom, compression chambers in each spoke with one head of the piston working in one chamber and the other head of the piston working in the other chamber, an intermediate chamber formed between said compression chambers and a supplemental piston head carried by the double ended piston and working in vacuum in said intermediate chamber.

16. In a vehicle wheel the combination of a rim and hub and intervening spokes, each spoke comprising a pair of telescoping tubular members, a floating piston operating in said tubular members and disconnected from both the rim and hub, with means pneumatically controlled by said floating piston for cushioning the wheel and for maintaining the hub and rim substantially concentric under working conditions.

17. In a vehicle wheel, the combination of a rim and a hub with inter-connecting spoke members, each spoke member comprising two telescoping cylinders, one of which is pivoted to the rim and the other to the hub, and a floating piston member housed in the two cylinders and disconnected from both the rim and hub with suitable air chambers formed in the cylinders and coöperating with said piston member to cushion the hub on the rim.

18. In a vehicle wheel, the combination of a rim and a hub with inter-connecting spoke members, each spoke member comprising two telescoping cylinders, one of which is pivoted to the rim and the other to the hub, a floating piston member housed in the two cylinders and disconnected from both the rim and hub, with suitable air chambers formed in the cylinders and coöperating with said piston member to cushion the hub on the rim, an air chamber formed between said heads, said last named chamber contractible and expansible in length as said cylinder heads move toward and from each other, and a vacuum acting piston head on said piston member constituting a cushioning means in said chamber.

19. In a cushioning device, the combination of two coacting opposing hollow telescoping members inclosing each a separate compression chamber, and a double ended piston disconnected from each member and having one head working in one of said compression chambers and the other head working in the other compression chamber.

20. In a cushioning device, the combination of two coacting opposing hollow telescoping members inclosing each a separate compression chamber, and a double ended piston disconnected from each member and having one head working in one of said compression chambers and the other head working in the other compression chamber, said piston heads each normally abutting against an end of its respective chambers and means by which one head works on compression on one side and as a pump on the other side when the sections are moved toward each other; and similarly the other head works on compression on one side and as a pump on the other when the members are moved apart.

21. In a vehicle wheel, the combination of a hub and a rim, spoke members made up of telescoping sections, one section of each spoke pivoted to the rim and the other section of all the spokes except one, pivoted to the hub, and a double floating piston in each of the spokes and disconnected therefrom, and from the rim and hub, with one head of the piston working in one section and the other head of the piston working in the other section.

22. In a vehicle wheel, the combination of a hub and rim, spoke members made up of telescoping sections, one section of each spoke pivoted to the rim and the other section pivoted to the hub, and a double piston in each of the spokes and disconnected therefrom, and from the rim and hub, with one head of the piston working in one section and the other head of the piston working in the other section, a vacuum chamber formed between the cylinders in which said heads work, and a vacuum-producing-piston carried by the double piston in said vacuum chamber.

23. In a vehicle wheel, the combination of a rim and a hub with inter-connecting spoke members, each spoke member comprising two telescoping cylinders, one of which is pivoted to the rim and the other to the hub, and a piston member housed in the two cylinders and disconnected from the rim and hub with suitable air chambers formed in the cylinders and coöperating with said piston member to cushion the hub on the rim, each of said cylinders having valved ports at their outer ends.

24. A vehicle wheel consisting in the combination of a hub, a rim and a series of longitudinally yieldable, radial cushioning spokes, all of said spokes pivotally connected with the rim and all of said spokes, except one, pivotally connected with the hub, said one being rigidly fixed in the hub and transmitting power to the rim and the rim having a limited swinging motion about the outer end of the one fixed spoke as a fulcrum.

25. A vehicle wheel consisting in the combination of a hub, a rim and a series of longitudinally yieldable cushioning spokes, all of which have their outer ends pivotally connected with the rim and all of which spokes, except one, have their inner ends pivotally connected with the hub, the one spoke so excepted fixedly secured radial of the hub and the outer pivotal connection of said spoke with the rim always being in the diameter of the hub which is coincident with said spoke, the rim having a limited swinging motion about the outer end of the one fixed spoke as a fulcrum.

26. A vehicle wheel consisting of a hub and a rim telescoping spoke sections with compressible elastic interior mediums, all but one of said spokes being pivotally connected with the hub and rim, said single spoke being rigidly fixed in the hub and transmitting power to the rim and said rim having a limited swinging movement about the outer end of the fixed spoke in unison with the compression and extension of all the spokes.

27. A cushioning device for opposing movable members, said device comprising cylinders connected respectively with the opposing members, and slidable one within the other, pistons fitting and slidable in the interior of the cylinders, diaphragms fixed in the cylinders and forming independent compression chambers, and a piston rod by which the pistons are connected to move in unison in their respective chambers, said pistons and piston rod disconnected from each movable member.

28. A cushioning device for opposing movable members, said device comprising cylinders connected respectively with the opposing members and slidable one within the other, floating pistons fitting and slidable in the interior of the cylinders, diaphragms fixed in the cylinders and forming independent compression chambers, a piston rod disconnected from the movable members by which the pistons are connected to move in unison in their respective chambers, and automatically acting valves by which air pressure is maintained.

29. A cushioning device for opposing movable members comprising two co-acting telescoping cylinders, each cylinder pivoted at its outer end to a respective one of said members, a floating piston working in the cylinders and disconnected from each of said movable members, and means by which on the relative movement of said members toward and from each other, said piston and cylinders co-act as a pump, automatically to take in air and to maintain a pneumatic cushion proportional to the load carried.

30. A cushioning device comprising the combination with two movable members of interconnecting co-acting telescoping cylinders, one cylinder connected to one of said members and the other cylinder connected to the other of said members and a double differential cushioning, floating piston with one end of the piston working in a compression chamber in one cylinder and the other end of the piston working in a compression chamber in the other cylinder, said piston disconnected from each of said members and having means for automatically replenishing the air in the compression chambers on the relative movement of said cylinders toward and from each other.

31. In a vehicle wheel, the combination with a rim and hub, of a spoke composed of two telescoping cylinders, one of which is pivoted to the rim and the other pivoted to the hub, a floating piston disconnected from each cylinder and also from the hub and rim, and having a head working in one cylinder and constructed and arranged so that on its being reciprocated it automatically operates to pump up air in its cylinder to provide a pneumatic cushion in the other cylinder.

32. In a vehicle wheel, the combination with a rim and hub, of a spoke composed of two telescoping cylinders, one of which is pivoted to the rim and the other pivoted to the hub, a floating piston disconnected from each cylinder and also from the hub and rim, and having a head working in one cylinder and constructed and arranged so that on its being reciprocated it automatically operates to pump up air in its cylinder to provide a pneumatic cushion in the other cylinder, the other end of the piston normally resting loose in the bottom of the other cylinder, and means whereby on the cylinders being drawn apart so as to pull said piston away from its seat in the bottom of said cylinder, the piston will later be automatically returned to said seat.

33. A vehicle wheel in which the spokes are composed of telescoping tubular members with pistons disconnected from the members and acting to compress air to form elastic cushions within the members, and in which the spoke members have their opposite ends pivoted to the hub and rim respectively, except a driving spoke which has one end rigidly fixed to the hub and the other end pivoted to the rim for the purpose of transmitting power to rotate the wheel.

34. A cushioning device comprising reciprocating telescopic tubular members inclosing a double piston one head of which respectively fits a chamber in each member and both heads normally abutting against an end of their chamber, and intermediate diaphragms between which and the pistons bodies of air are constantly compressed by the reciprocation of the parts.

In testimony whereof I have hereunto set my hand in the presence of two subscribing witnesses.

LUCIEN R. GRUSS.

Witnesses:
CHARLES EDELMAN,
CHARLES A. PENFIELD.